No. 640,376. Patented Jan. 2, 1900.
J. D. GRAY.
PEA OR BEAN HARVESTER.
(Application filed Dec. 19, 1898.)
(No Model.)
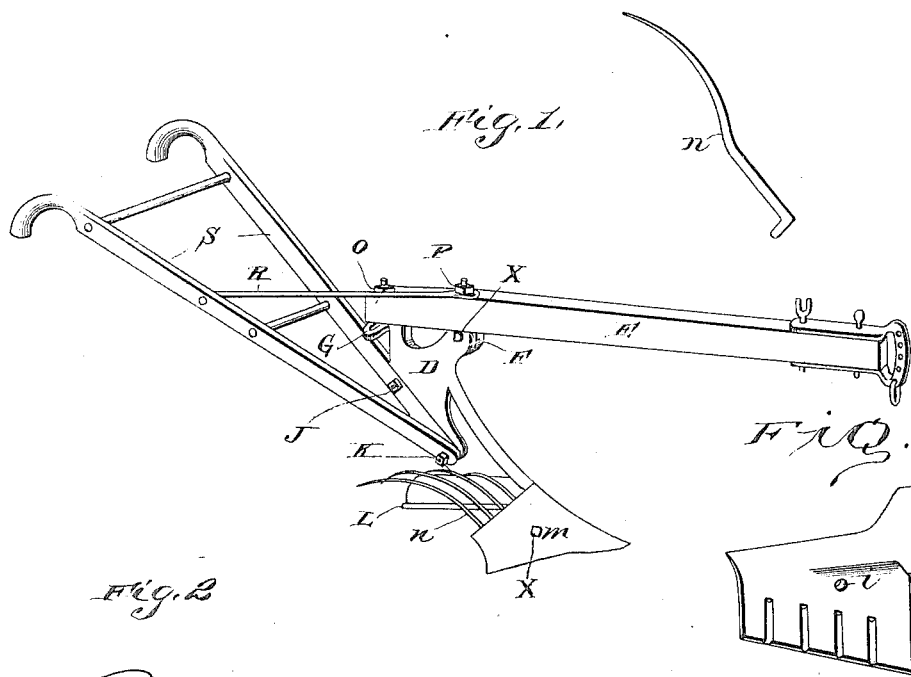
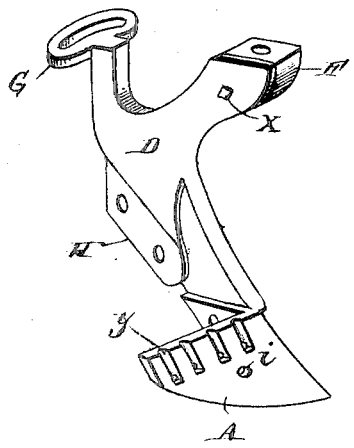
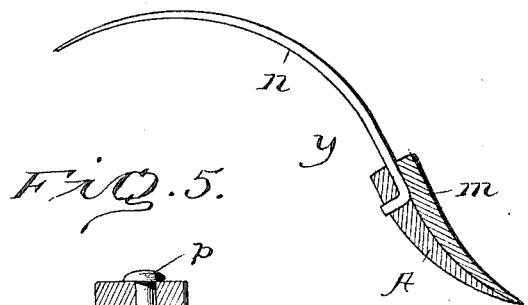
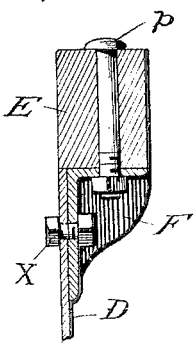
Witnesses:
George W Gray
George J Lyon
Inventor:
John D Gray

UNITED STATES PATENT OFFICE.

JOHN D. GRAY, OF WOODFORD, VIRGINIA.

PEA OR BEAN HARVESTER.

SPECIFICATION forming part of Letters Patent No. 640,376, dated January 2, 1900.

Application filed December 19, 1898. Serial No. 699,757. (No model.)

*To all whom it may concern:*

Be it known that I, JOHN D. GRAY, a citizen of the United States, residing at Woodford, in the county of Caroline and State of Virginia, have invented a certain new and useful Pea or Bean Harvester; and I do hereby declare the following to be a full, clear, and exact description of the invention, such as will enable others skilled in the art to which it appertains to make and use the same.

My invention relates to certain new and useful improvements in harvesters; and the primary object thereof is to provide an apparatus for harvesting beans and peas which is simple in construction and adapted to perform the work in a speedy and efficient manner.

Further objects of the invention are to provide an improved construction of share and tines or fingers for uprooting the vines and separating the earth therefrom, to provide an improved construction of parts for detachably securing the fingers to the share in a simple and efficient manner, to provide improved devices for attachment of the beam to the standard so that said beam may be adjusted laterally to change the line of draft and adapt the harvester for the attachment thereto of one or two draft-animals, and to otherwise generally simplify and improve the construction and increase the practical efficiency of harvesters of this class.

With the accomplishment of these ends in view the invention consists of certain novel features of construction, combination, and arrangement of parts, which will be hereinafter more fully described, and particularly pointed out in the appended claims, reference being had to the accompanying drawings, forming a part of this specification, and in which—

Figure 1 is a perspective view of a bean and pea harvester embodying my invention. Fig. 2 is a similar view of the standard thereof detached. Fig. 3 is a detail view of one of the tines or fingers. Fig. 4 is an inverted inner perspective view of the point of the share. Fig. 5 is a vertical cross-section through the front arm of the standard, beam, and bracket or offset. Fig. 6 is a vertical section of the share, showing the manner of attaching the fingers.

Referring now more particularly to the drawings, wherein like reference-letters designate corresponding parts throughout the several views, D represents the standard of the harvester, which inclines rearwardly, as shown, and is bifurcated at its upper end to form front and rear arms D' and D² and provided at its lower end with a digger or opener composed of a lateral wing A, formed integral therewith, and a detachable share M, having a point $m$. There is a recess or socket H formed in the rear portion of the standard to receive the lower end of one of the handles S, which is secured thereto at one point by a bolt J and at another point by a bolt K, which latter also serves to secure the lower end of the other handle to the standard at the same point. The handles are held securely by the brace R, which connects them with the beam. The standard is also recessed to receive the landside-bar L, which is secured thereto by a bolt L' and lies flush therewith to form a smooth joint.

The wing of the standard and the share are provided in their meeting faces with registering grooves $y$ and $y'$, which form seats for the reception of the front ends of the supporting and separating tines or fingers $n$, and communicating with the lower ends of the grooves in the wing are right-angular sockets or openings $o$. The fingers $n$ are arranged in horizontal alinement or in the same plane and project rearwardly from the digger or opener in parallelism, and each finger is provided with a straight front end portion $n'$, fitted in one of said seats and terminating in a right-angular lug or projection $n^2$, which fits in the opening at the lower end of the seat, as shown in Fig. 6. The share is secured to the wing by one or more bolts $i$, extending through openings formed between the grooves, and by this construction it will be seen that when the share is applied the fingers are clamped between the meeting faces of the share and wing and are thereby held firmly against both lateral and longitudinal movement, while the lugs or projections prevent the fingers from working out and relieve the share of undue strain. The rear portions $n^3$ of the fingers curve upwardly above the plane of the upper edge of the digger or opener and have downturned ends $n^4$, which terminate substantially in the plane of the upper edge of the digger, and the fingers are spaced a sufficient distance apart to allow the earth which is separated from the vines passing over the same to drop down between them to the ground, in the manner hereinafter described.

The front arm D' of the standard is formed with a transverse hole for the reception of a bolt $f$, which passes through the vertical body portion of a substantially L-shaped bracket casting or offset F, and secures the latter upon the side of the arm, with its top plate in line with the upper surface thereof, and formed upon the rear face of the rear arm $D^2$ is a slotted transverse plate G, which projects beyond the sides of the standard. The beam E is secured to the bracket and slotted plate by means of the bolts $o$ and $p$ and may be adjusted laterally to project from either side of the standard when it is desired to change the line of draft by simply reversing the position of the bracket and sliding the bolt $o$ from one end to the other of the slotted plate accordingly. In the present instance the beam is shown supported upon the side of the standard opposite the digger or opener, which is the proper arrangement to secure a central draft when one draft-animal is employed; but when it is desired to employ two draft-animals walking on opposite sides of the row the beam is shifted laterally and secured upon the same side of the standard as the digger, as will be readily understood. The arrangement of the beam as shown in Fig. 1 throws the same to one side of the line of travel of the vines, and thus prevents choking of the harvester while in operation.

In operation the point of the digger is brought directly under the roots of the vines in the row to be harvested, and in the forward movement of the harvester the vines are uprooted and forced, together with the earth displaced, up over the share and upon the tines or fingers, which latter are spaced apart sufficient to allow the earth to fall directly down into and close the trench or furrow formed by the digger. The vines in moving rearwardly are elevated a short distance above the surface of the ground by the upwardly-curved portions of the fingers, so as to allow all the earth to free itself and drop down and then slide off the downward rear ends of the same onto the ground in condition to be readily taken up and piled with forks. The downturned ends of the fingers are of importance in allowing the vines to move freely without resistance and to be deposited upon the ground with a minimum fall, whereby the breaking off or threshing of the pods and choking of the vines on the fingers is avoided and a free and easy movement of the same insured.

It will of course be understood that changes in the form, proportion, and minor details of construction may be made within the scope of the invention without departing from the spirit or sacrificing any of the advantages thereof.

Having thus described my invention, what I claim as new, and desire to secure by Letters Patent, is—

1. In a harvester of the character described, the combination of a standard, a digger or opener composed of a wing formed integrally with and extending laterally from the standard and a share detachably secured thereto, said parts being provided in their meeting faces with registering grooves forming seats and the wing with openings communicating with the lower ends of the grooves therein, and rearwardly-projecting fingers or tines having their front ends fitted in said seats and clamped between the wing and share and provided with lugs or projections entering said openings, substantially as described.

2. A bean and pea harvester comprising, in combination, a standard bifurcated at its upper end to form front and rear arms, a slotted plate upon the rear surface of the rear end and projecting transversely beyond the sides of the beam, a bracket-plate reversible for application upon either side of the front arm, a beam supported by said arms and connected by bolts or analogous fastening devices to the slotted plate and bracket, a digger or opener upon the lower end of the standard and projecting laterally at one side thereof, and fingers or tines extending rearwardly from the digger.

In testimony whereof I affix my signature in presence of two witnesses.

JOHN D. GRAY.

Witnesses:
GEORGE W. GRAY,
GEORGE P. LYON.